United States Patent [19]
Mihm

[11] Patent Number: 5,429,386
[45] Date of Patent: Jul. 4, 1995

[54] AUTO IGNITION DEVICE FOR AN AIR BAG INFLATOR

[75] Inventor: Joseph J. Mihm, North Branch, Mich.

[73] Assignee: TRW Vehicle Safety System Inc., Lyndhurst, Ohio

[21] Appl. No.: 72,881

[22] Filed: Jun. 7, 1993

[51] Int. Cl.6 .............................................. B60R 21/26
[52] U.S. Cl. ..................................... 280/734; 280/735; 280/736; 280/737; 220/201; 220/583; 102/481; 222/5; 222/54; 251/11
[58] Field of Search ............... 280/734, 736, 737, 741; 251/11; 137/68.1; 222/3, 5, 54; 220/89.1, 89.3, 201, 207, 583; 102/530, 531, 481, 205

[56] References Cited

U.S. PATENT DOCUMENTS

| | | | |
|---|---|---|---|
| 3,069,125 | 12/1962 | Hewitt, Jr. | 251/11 |
| 3,297,845 | 1/1967 | Mertler . | |
| 3,773,352 | 11/1973 | Radke | 102/531 |
| 3,971,319 | 7/1976 | Larson | 102/204 |
| 4,066,415 | 1/1978 | Kasama | 280/741 |
| 4,430,392 | 2/1984 | Kelley et al. | 429/53 |
| 4,493,664 | 1/1985 | Dale | 222/5 |
| 4,561,675 | 12/1985 | Adams et al. | 280/734 |
| 4,660,714 | 4/1987 | Suzuki | 220/583 |
| 5,003,887 | 4/1991 | Unterforsthuber | 251/11 |
| 5,035,182 | 7/1991 | Purcell et al. | 220/89.1 |
| 5,060,470 | 10/1991 | VanName | 102/481 |
| 5,076,607 | 12/1991 | Woods et al. | 280/737 |
| 5,078,422 | 1/1992 | Hamilton et al. | 280/736 |
| 5,100,170 | 3/1992 | Mihm et al. | 280/736 |
| 5,100,174 | 3/1992 | Jasken et al. | 280/741 |
| 5,320,382 | 6/1994 | Goldstein et al. | 280/735 |

FOREIGN PATENT DOCUMENTS 1-229739  9/1989  Japan ..................... 280/736

Primary Examiner—Karin L. Tyson
Attorney, Agent, or Firm—Tarolli, Sundheim & Covell

[57] ABSTRACT

An air bag system (10) includes an inflator (14) containing ignitable gas generating material (60) which, when ignited, generates gas for inflating the air bag (12). The system (10) further includes a collision sensor (96), a first actuator assembly (64) and a second actuator assembly (62). The collision sensor (96) senses a predetermined amount of vehicle deceleration which is indicative of a collision, and provides a collision signal upon sensing such deceleration. The first actuator assembly (64) ignites the gas generating material (60) in response to the collision signal. The second actuator assembly (62) ignites the gas generating material (60) when the ambient temperature of the inflator (14) reaches a predetermined elevated level. The second actuator assembly (62) includes a bi-metal disk (112) which deflects from a concave shape to a relatively convex shape when the ambient temperature increases to the predetermined elevated level. When the bi-metal disk (112) deflects into the relatively convex shape, it moves a firing pin member (120) forcibly against a primer (108) to actuate the primer (108). The primer (108) then ignites the gas generating material (60).

3 Claims, 3 Drawing Sheets

AUTO IGNITION DEVICE FOR AN AIR BAG INFLATOR

FIELD OF THE INVENTION

The present invention relates to an inflator for an inflatable device, such as an air bag in a vehicle, and particularly relates to an auto-ignition device for such an inflator.

BACKGROUND OF THE INVENTION

An air bag system for restraining a vehicle occupant commonly includes an inflator containing gas generating material which, when ignited, rapidly produces a large volume of gas for inflating the air bag. Such a system also includes a collision sensor. The collision sensor senses the occurrence of a predetermined amount of vehicle deceleration indicative of a collision, and completes a circuit to provide an electrical signal upon sensing such vehicle deceleration. The gas generating material in the inflator is ignited in response to the electrical signal. The gas generating material is thus ignited to produce the gas for inflating the air bag upon the occurrence of a vehicle collision.

The inflator may become subjected to abnormally high ambient temperatures if, for example, the vehicle is involved in a fire. The gas generating material could then become heated to a temperature at which it is ignited by the heat of the fire. It is known to include an auto-ignition material in the inflator to prevent the gas generating material from being ignited at a time when the ambient temperature of the vehicle has reached an excessively high level. The auto-ignition material will ignite at a temperature that is lower than the temperature at which the gas generating material will ignite. When the ambient temperature of the vehicle reaches the ignition temperature of the auto-ignition material, the auto-ignition material ignites automatically. The auto-ignition material then produces products of combustion that ignite the gas generating material. The gas generating material is thus ignited before the ambient temperature of the vehicle reaches an excessively high level.

SUMMARY OF THE INVENTION

In accordance with the present invention, an apparatus for inflating an inflatable vehicle occupant restraint, such as an air bag, comprises an inflator means and a collision sensor means. The inflator means includes a source of inflation fluid for inflating the vehicle occupant restraint, and supplies inflation fluid from the source when the inflator means is actuated. The collision sensor means senses a predetermined amount of vehicle deceleration indicative of a collision, and provides a collision signal upon sensing the predetermined amount of deceleration. The apparatus further includes a first actuator means and a second actuator means. The first actuator means actuates the inflator means in response to the collision signal. The second actuator means actuates the inflator means when the ambient temperature of the inflator means reaches a predetermined elevated level.

The second actuator means includes an actuator member which is deflectable under the influence of heat. The actuator member deflects into a predetermined condition when the ambient temperature of the inflator means reaches the predetermined elevated level. The second actuator means actuates the inflator in response to deflection of the actuator member into the predetermined condition.

In a first preferred embodiment of the present invention, the source of inflation fluid comprises an ignitable gas generating material which, when ignited, generates gas for inflating the vehicle occupant restraint. The predetermined elevated temperature at which the actuator member deflects into the predetermined condition is lower than the elevated temperature at which the gas generating material would ignite automatically. The second actuator means ignites the gas generating material in response to deflection of the actuator member into the predetermined condition, and thus ignites the gas generating material before the ambient temperature of the inflator means increases to the greater elevated level at which the gas generating material would ignite automatically.

In a second preferred embodiment of the present invention, the inflator means includes a container means for defining a sealed chamber which contains gas for inflating the vehicle occupant restraint. The container means includes a container wall which is rupturable to release the gas from the sealed chamber when the inflator means is actuated. The predetermined elevated temperature at which the actuator member deflects into the predetermined condition is lower than an elevated temperature at which it would become undesirable to maintain the gas under pressure in the chamber. The second actuator means ruptures the rupturable container wall to release the gas from the chamber in response to deflection of the actuator member into the predetermined condition. The second actuator means thus releases the gas from the chamber before the ambient temperature of the chamber reaches the greater elevated level at which it would be undesirable to maintain the gas under pressure in the chamber.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS

Figure 1:
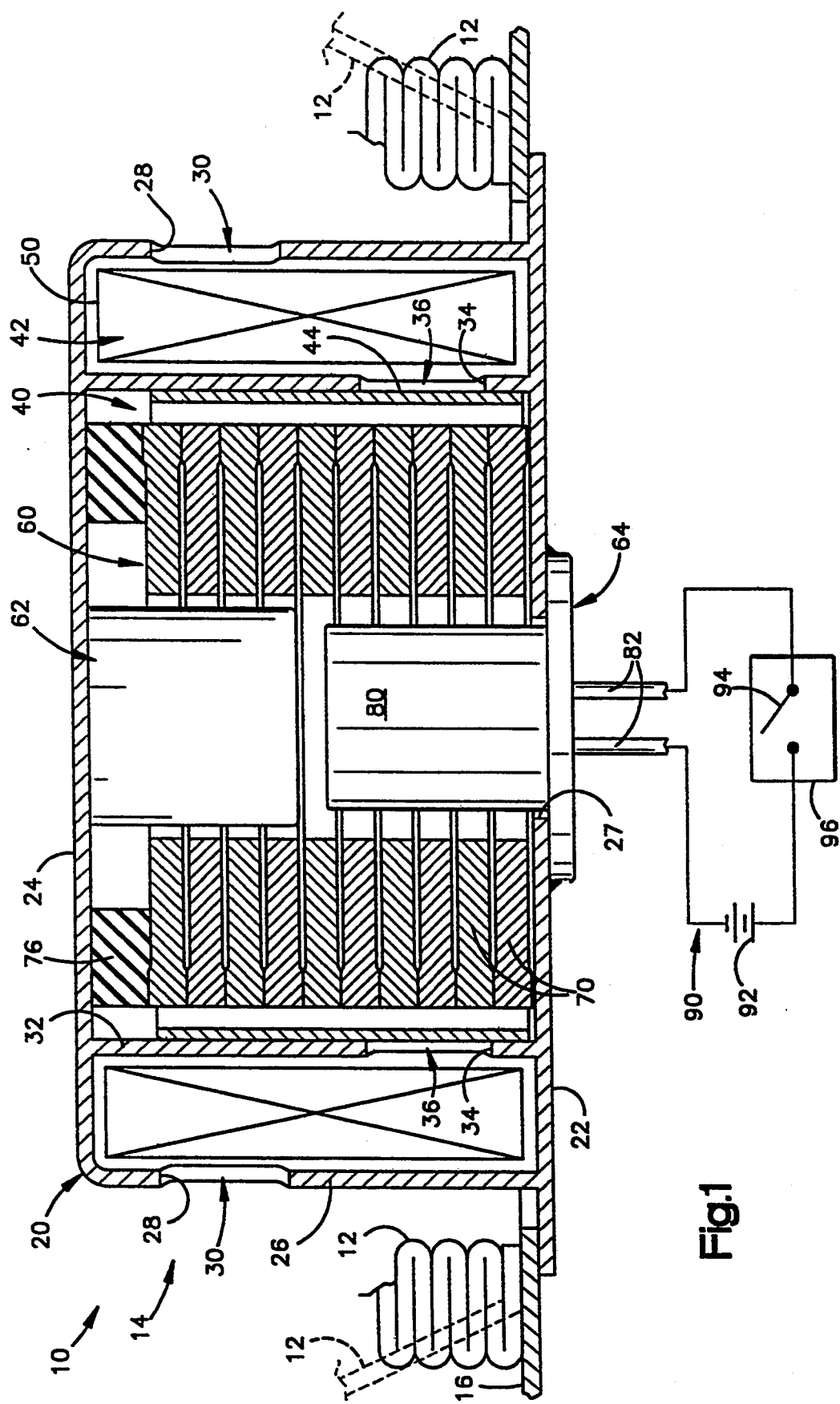
FIG. 1 is a schematic view of a vehicle occupant restraint system which is a first embodiment of the present invention.
Figure 2:
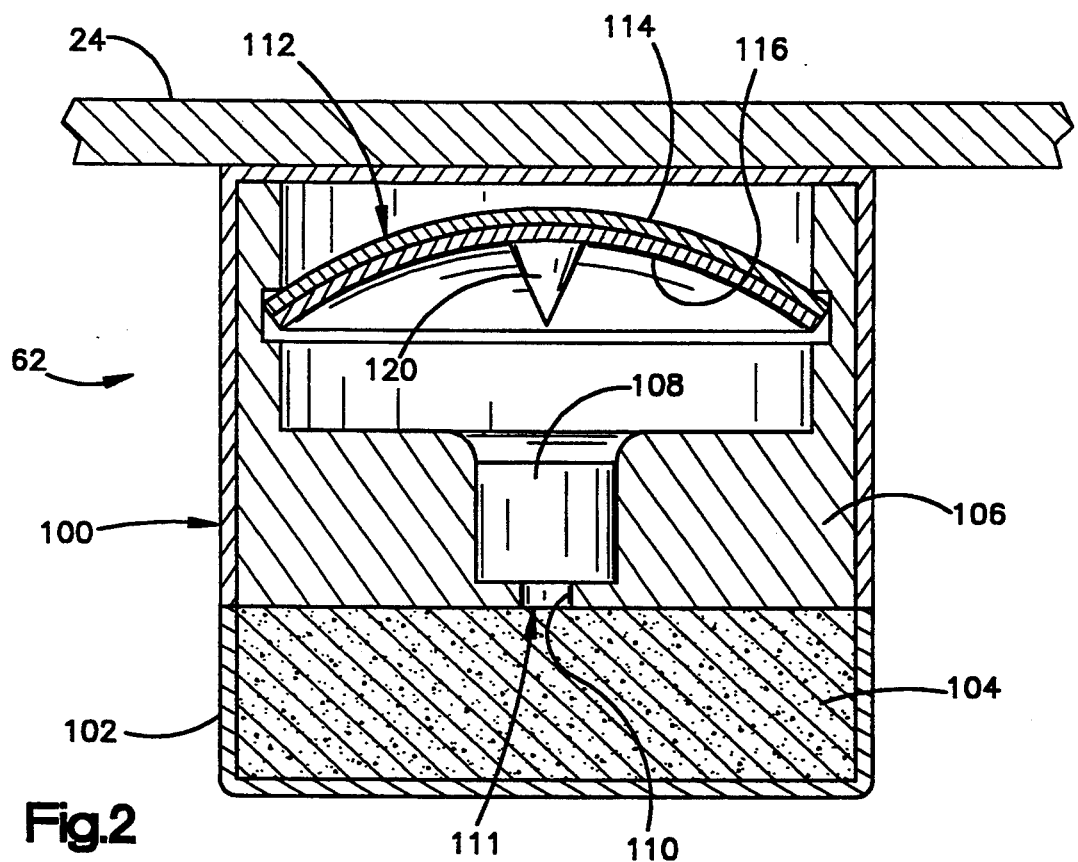
FIG. 2 is a sectional view of parts of the system of FIG. 1.
Figure 3:
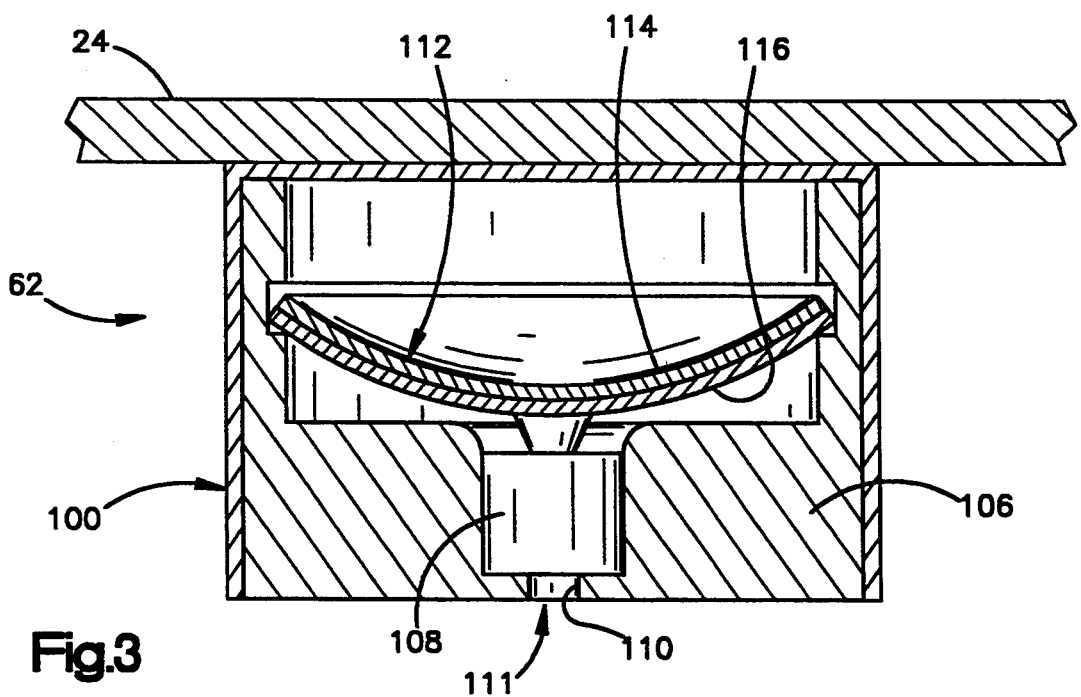
FIG. 3 is view of the parts of FIG. 2 in different positions.

A first embodiment of the present invention is shown in FIGS. 1-3. As shown schematically in FIG. 1, a vehicle occupant restraint system 10 constructed in accordance with the present invention includes an inflatable vehicle occupant restraint 12, commonly referred to as an air bag, and an inflator 14. The system 10 further includes a base plate 16 which supports the air bag 12 and the inflator 14 on a vehicle steering wheel (not shown) in a known manner. The air bag 12 has a folded condition, as indicated partially in solid lines in FIG. 1, and has an inflated condition, as indicated partially in dashed lines in FIG. 1. The system 10 is actuated upon the occurrence of a vehicle collision. The inflator 14 then directs a rapid flow of inflation fluid, specifically an inert gas, into the air bag 12 to inflate the air bag 12 from the folded condition to the inflated condition. When the air bag 12 is in the inflated condition, it extends rearwardly from the steering wheel toward the driver of the vehicle and restrains movement of the driver.

The inflator 14 has a cylindrical housing 20 with a circular lower end wall 22, a circular upper end wall 24, and a cylindrical outer wall 26. The lower end wall 22 has an inner edge surface 27 defining an opening extending through the lower end wall 22. The outer wall 26 has a plurality of inner edge surfaces 28 which define gas flow openings 30 extending through the outer wall 26.

The housing 20 also has a cylindrical inner wall 32. The inner wall 32 has a plurality of inner edge surfaces 34 which define gas flow openings 36 extending through the inner wall 32. The housing 20 thus defines a combustion chamber 40 radially inward of the inner wall 32, and further defines a gas flow chamber 42 between the inner wall 32 and the outer wall 26. A sheet 44 of rupturable pressure controlling material extends around the inner surface of the inner wall 32 and over the gas flow openings 36. The sheet 44 of rupturable pressure controlling material blocks the flow of gas radially outward through the gas flow openings 36 from the combustion chamber 40 to the gas flow chamber 42.

An annular filter assembly 50 is contained within the housing 20 in the gas flow chamber 42. A source of inflation fluid in the form of combustible gas generating material 60 and an auto-ignition device 62 are contained within the housing 20 in the combustion chamber 40. An igniter 64 extends into the combustion chamber 40 through the opening defined by the inner edge surface 27 of the lower end wall 22.

The gas generating material 60 includes a plurality of annular disks 70 of gas generating material. The disks 70 of gas generating material are stacked in the combustion chamber 40 in a cylindrical shape, as shown in FIG. 1. The disks 70 are formed of a known material which, when ignited, rapidly produces a large volume of gas. Although many types of gas generating material could be used in the inflator 14, especially suitable gas generating materials are disclosed in U.S. Pat. No. 3,895,098. An annular cushion 76 holds the disks 70 in place in the combustion chamber 40.

The igniter 64 is of known construction, and includes a casing 80 containing a pyrotechnic charge. The pyrotechnic charge can be formed of any suitable pyrotechnic material known in the art. The igniter 64 is actuated upon the passage of electric current through the igniter 64 between a pair of lead wires 82.

The restraint system 10 further includes an electrical circuit 90. The electrical circuit 90 includes a power source 92, which is preferably the vehicle battery, and a normally open switch 94. The switch 94 is preferably part of a deceleration sensor 96. The deceleration sensor 96 senses the occurrence of a predetermined amount of vehicle deceleration indicative of a collision, and closes the switch 94 upon sensing the occurrence such deceleration. Electric current then passes between the lead wires 82 in the igniter 64 to actuate the igniter 64.

When the igniter 64 is actuated, the pyrotechnic charge in the igniter 64 ignites and produces products of combustion which rupture the casing 80 and emerge from the igniter 64 in the combustion chamber 40. The products of combustion emerging from the igniter 64 move against the ignitable gas generating material 60 and ignite the gas generating material 60. Each of the disks 70 of gas generating material then burns in the combustion chamber 40 and produces products of combustion including heat, hot particles and a large volume of gas.

The gas generated in the combustion chamber 40 is at first confined within the combustion chamber 40 by the sheet 44 of rupturable pressure controlling material which extends over the gas flow openings 36. When the pressure of the gas in the combustion chamber 40 reaches a predetermined elevated level, the gas ruptures the sheet 44 of rupturable pressure controlling material and emerges from the combustion chamber 40 through the gas flow openings 36. The gas then flows radially outward through the filter member 50, which cools the gas and removes hot particles from the gas, and emerges from the inflator 14 through the gas exit openings 30 to inflate the air bag 12. The air bag 12 is thus inflated from the folded condition to the inflated condition upon the occurrence of a vehicle collision.

The auto-ignition device 62 is shown in detail in FIGS. 2 and 3. As shown in FIG. 2, the auto-ignition device 62 includes a housing 100 with a rupturable end portion 102. The housing 100 is fixed to the upper end wall 24 of the inflator housing 20 by any suitable means, such as by an adhesive. The rupturable end portion 102 of the housing 100 contains a pyrotechnic charge 104 which, like the pyrotechnic charge in the igniter 64, is formed of a suitable pyrotechnic material known in the art. A support member 106 in the housing 100 supports a primer 108 in a position adjacent to the pyrotechnic charge 104. The primer 108 can be a percussion primer or a stab primer, as known in the art, and emits products of combustion when actuated. The support member 106 has a cylindrical inner surface 110 which defines a flash hole 111 for directing the products of combustion from the primer 108 to the pyrotechnic charge 104.

The support member 106 also supports an actuator member 112 in the housing 100. The actuator member 112 is a disk having first and second metal layers 114 and 116. The first metal layer 114 has a first coefficient of thermal expansion, and the second metal layer 116 has a second coefficient of thermal expansion different from the first coefficient of thermal expansion. The actuator member 112 is thus constructed as a bi-metal snap action disk which deflects under the influence of heat as a result of the difference between the first and second coefficients of thermal expansion. More specifically, the actuator member 112 has an initial condition, as shown in FIG. 2, in which the shape of the actuator member 112 is concave relative to the primer 108. A firing pin member 120 on the actuator member 112 is then spaced from the primer 108. As the ambient temperature increases, the actuator member 112 deflects from the condition shown in FIG. 2 toward a flat condition, and thus moves the firing pin member 120 toward the primer 108.

The actuator member 112 is designed with reference to a predetermined elevated temperature. The predetermined elevated temperature is lower than the elevated temperature at which the gas generating material 60 would ignite automatically. When the ambient temperature increases to the predetermined elevated temperature, the actuator member 112 deflects beyond the flat condition toward a condition in which its shape is convex relative to the primer 108. The actuator member 112 then snaps quickly into the condition shown in FIG. 3, and thus moves the firing pin member 120 forcibly against the primer 108. The primer 108 is thereby actuated by the firing pin member 120, and emits products of combustion through the flash hole 111 to ignite the pyrotechnic charge 104. The ignited pyrotechnic charge 104 emits products of combustion which rupture the rupturable end portion 102 of the housing 100. The products of combustion of the pyrotechnic charge 104 emerge from the housing 100 in the combustion chamber 40 (FIG. 1) and ignite the gas generating material 60 in the combustion chamber 40. The gas generating material 60 is thus ignited by the auto-ignition device 62 at a predetermined elevated temperature which is lower than the temperature at which the gas generating material 60 would ignite.

Figure 4:
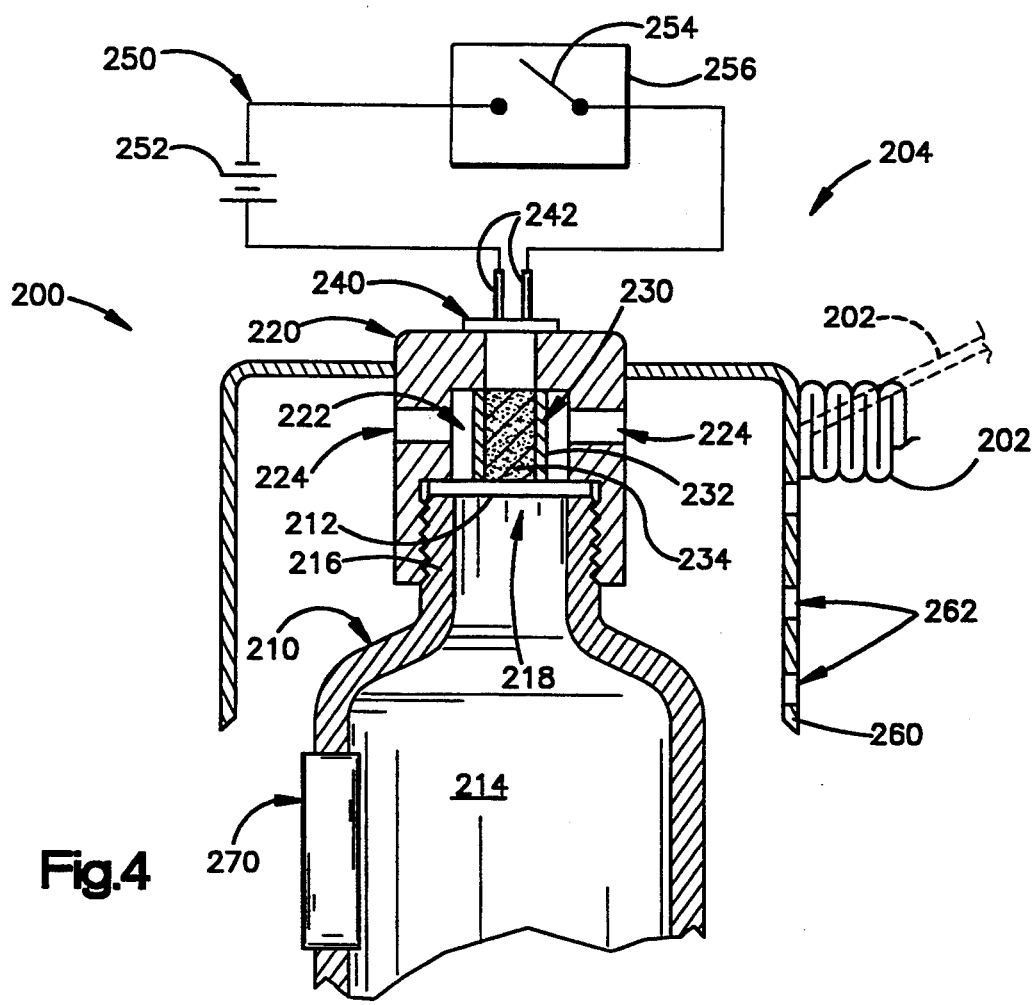
FIG. 4 is a schematic view of a vehicle occupant restraint system which is a second embodiment of the present invention.
Figures 5, 6:
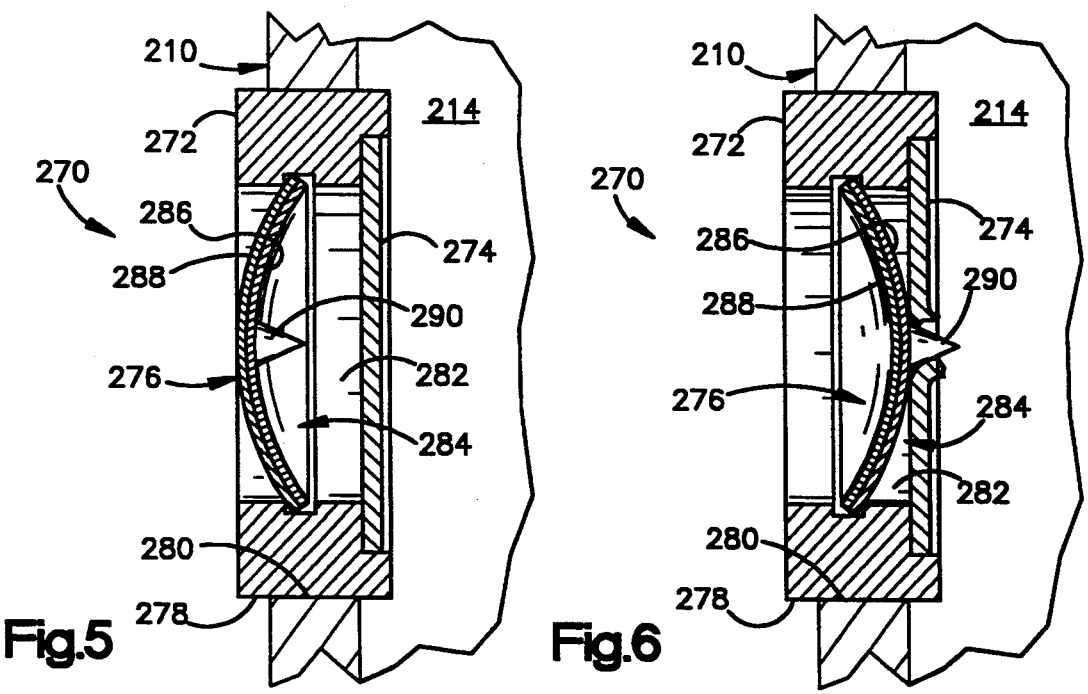
FIG. 5 is an enlarged sectional view of parts of the system of FIG. 4.
FIG. 6 is a view of the parts of FIG. 5 in different positions.

A second embodiment of the present invention is shown schematically in FIGS. 4–6. As shown in FIG. 4, a vehicle occupant restraint system 200 constructed in accordance with the present invention includes an air bag 202 and an inflator assembly 204. The inflator assembly 204 inflates the air bag 202 from a folded condition, as indicated partially in solid lines in FIG. 4, to an inflated condition, as indicated partially in dashed lines in FIG. 4, upon the occurrence of a vehicle collision.

The inflator assembly 204 includes a pressure vessel 210 with a rupturable closure wall 212. The pressure vessel 210 defines a chamber 214, and has a neck portion 216 with an opening 218. The rupturable closure wall 212 is welded to the neck portion 216 over the opening 218, and seals the chamber 214. A quantity of gas under pressure is stored in the sealed chamber 214.

A closure cap 220 is received over the neck portion 216 of the pressure vessel 210, as shown in FIG. 4. The closure cap 220 has a plurality of cylindrical inner surfaces defining a central chamber 222 and a plurality of gas flow passages 224. The gas flow passages 224 extend radially from the central chamber 222 and communicate the central chamber 222 with the exterior of the closure cap 220.

An igniter 230 is located in the central chamber 222 in the closure cap 220. The igniter 230 includes a cylindrical casing 232 containing a pyrotechnic charge 234. The pyrotechnic charge 234 can be formed of any suitable pyrotechnic material known in the art.

A squib 240 is supported by the closure cap 220 in a position adjoining the igniter 230. The squib 240 contains a pyrotechnic charge which also can be formed of any suitable material known in the art. The squib 240 has a pair of lead wires 242 which are connected in an electrical circuit 250. The electrical circuit 250, like the electrical circuit 90 described above, includes a power source 252 which is preferably the vehicle battery, and further includes a normally open switch 254 which is preferably a part of a vehicle deceleration sensor 256.

When the vehicle experiences a collision, the vehicle deceleration sensor 256 closes the switch 254 to complete the circuit 250 and actuate the squib 240. The pyrotechnic charge in the squib 240 is then ignited and emits products of combustion which ignite the pyrotechnic charge 234 in the igniter 230. The ignited pyrotechnic charge 234 emits products of combustion including heat and a pressure wave which rupture the casing 232 and the rupturable closure wall 212. The products of combustion of the pyrotechnic charge 234 thus open the sealed chamber 214 and release the gas in the chamber 214 to flow outward through the opening 218. The products of combustion of the pyrotechnic charge 234 also enter the chamber 214 to heat and pressurize the gas in the chamber 214, either directly or through ignition of additional combustible material in the chamber 214. As the gas emerges from the gas flow passages 224 in the closure cap 220, a diffuser 260 directs the gas outward through gas flow openings 262 and into the air bag 202 to inflate the air bag 202. The air bag 202 is thus inflated from the folded condition to the inflated condition upon the occurrence of a vehicle collision.

As shown in FIG. 4, the vehicle occupant restraint system 200 further includes an auto-release device 270. As shown in detail in FIGS. 5 and 6, the auto-release device 270 includes a support member 272, a second rupturable closure wall 274, and an actuator member 276.

The support member 272 has a peripheral surface 278, and is closely received within an opening defined by an inner edge surface 280 of the pressure vessel 210. The support member 272 is preferably welded to the pressure vessel 210 around the peripheral surface 278 to block the gas in the chamber 214 from flowing outward between the surfaces 278 and 280. A cylindrical inner surface 282 of the support member 272 defines a passage 284 extending through the center of the support member 272. The second rupturable closure wall 274 is welded to the support member 272 in a position extending across the passage 284, and blocks the gas in the chamber 214 from flowing outward through the passage 284.

The actuator member 276 is supported in the passage 284 outward of the second rupturable closure wall 274. The actuator member 276 is a disk having first and second metal layers 286 and 288. The first metal layer 286 has a first coefficient of thermal expansion, and the second metal layer 288 has a second coefficient of thermal expansion which differs from the first coefficient of thermal expansion. The actuator member 276 is thus constructed as a bi-metal snap action disk which deflects under the influence of heat as a result of the difference between the first and second coefficients of thermal expansion.

The actuator member 276 has an initial condition, as shown in FIG. 5, in which the shape of the actuator member 276 is concave relative to the second rupturable closure wall 274. A punch member 290 on the actuator member 276 is then spaced from the second rupturable closure wall 274. As the ambient temperature increases, the actuator member 276 deflects from the condition shown in FIG. 5 toward a flat condition, and thus moves the punch member 290 toward the second rupturable closure wall 274. When the ambient temperature increases to a predetermined elevated level, the actuator member 276 deflects beyond a flat condition toward a condition in which its shape is convex relative to the second rupturable closure wall 274. The actuator member 276 then snaps quickly into the condition shown in FIG. 6, and thus moves the punch member 290 forcefully against the second rupturable closure wall 274 to rupture the second rupturable closure wall 274. The gas in the chamber 214 then flows outward through the passage 284 past the second rupturable closure wall 274 and around the actuator member 276. The auto-release device 270 thus operates to release the gas from the chamber 214 before the ambient temperature reaches an excessively high level at which it would be undesirable to contain the gas under pressure in the chamber 214.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable vehicle occupant restraint, said apparatus comprising:

inflator means for inflating the vehicle occupant restraint, said inflator means including a source of inflation fluid and supplying inflation fluid from said source when said inflator means is actuated;

collision sensor means for sensing vehicle deceleration indicative of a vehicle collision and for providing an actuation signal in response to said deceleration;

actuator means for actuating said inflator means in response to said actuation signal; and safety means for actuating said inflator means automatically when the ambient temperature of said inflator means reaches a predetermined elevated level;

said safety means including an actuator member which is deflectable under the influence of heat, said actuator member deflecting into a predetermined condition when the ambient temperature of said inflator means reaches said predetermined elevated level;

said safety means further including means for actuating said inflator means in response to deflection of said actuator member into said predetermined condition;

said source of inflation fluid comprising an ignitable gas generating material which, when ignited, generates gas, said inflator means being actuated when said gas generating material is ignited;

said first actuator means including a first ignitable charge material and means for igniting said first ignitable charge material in response to said collision signal, said first ignitable charge material producing products of combustion that ignite said gas generating material when said first ignitable charge material is ignited;

said second actuator means including a second ignitable charge material and means for igniting said second ignitable charge material in response to deflection of said actuator member into said predetermined condition, said second ignitable charge material producing products of combustion that ignite said gas generating material when said second ignitable charge material is ignited.

2. Apparatus defined in claim 1 wherein said second actuator means includes a primer member containing said second ignitable charge material, said second actuator means further including a firing pin member supported on said actuator member, said actuator member moving said firing pin member forcibly against said primer member to ignite said second ignitable charge material upon deflection of said actuator member into said predetermined condition.

3. Apparatus defined in claim 2 wherein said actuator member has a first metal part with a first coefficient of thermal expansion and a second metal part with a second coefficient of thermal expansion different from said first coefficient of thermal expansion, said actuator member having a concave shape and being deflectable under the influence of heat from said concave shape to a relatively convex shape, said relatively convex shape being said predetermined condition of said actuator member.

* * * * *